(12) United States Patent
Hamada et al.

(10) Patent No.: US 12,214,797 B2
(45) Date of Patent: Feb. 4, 2025

(54) VEHICLE INFORMATION PROVIDING SYSTEM

(71) Applicant: TOYOTA JIDOSHA KABUSHIKI KAISHA, Aichi-ken (JP)

(72) Inventors: Kentaro Hamada, Toyota (JP); Kotaro Hoshihara, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 62 days.

(21) Appl. No.: 18/307,797

(22) Filed: Apr. 27, 2023

(65) Prior Publication Data
US 2024/0075948 A1 Mar. 7, 2024

(30) Foreign Application Priority Data

Apr. 28, 2022 (JP) ................... 2022-075449

(51) Int. Cl.
*B60W 50/14* (2020.01)
*B60K 35/00* (2024.01)
*B60K 35/28* (2024.01)
*B60K 35/29* (2024.01)
*B60K 35/60* (2024.01)
(Continued)

(52) U.S. Cl.
CPC ............ *B60W 50/14* (2013.01); *B60K 35/00* (2013.01); *B60L 53/65* (2019.02); *B60Q 1/543* (2022.05); *G06Q 30/0283* (2013.01); *G06V 20/52* (2022.01); *B60K 35/28* (2024.01); *B60K 35/29* (2024.01); *B60K 35/60* (2024.01); *B60K 2360/169* (2024.01); *B60K 2360/188* (2024.01); *B60K 2360/797* (2024.01); *B60L 2270/12* (2013.01); *B60Q 2400/20* (2013.01);
(Continued)

(58) Field of Classification Search
CPC ...................................................... B60W 50/14
See application file for complete search history.

(56) References Cited

U.S. PATENT DOCUMENTS 9,457,665 B1 * 10/2016 Boss ..................... G06V 40/161
2011/0043355 A1 * 2/2011 Chander ................ B60K 15/05
320/109
(Continued)

FOREIGN PATENT DOCUMENTS

JP 2004249753 * 9/2004 ............ B60K 35/00
JP 2009-264363 A 11/2009
(Continued)

*Primary Examiner* — Joseph H Feild
*Assistant Examiner* — Pameshanand Mahase
(74) *Attorney, Agent, or Firm* — HAUPTMAN HAM, LLP

(57) ABSTRACT

A vehicle information providing system is realized, which is capable of providing appropriate vehicle information depending on a used driving energy source. The kind of fuel used when refueling a vehicle is identified based on image information from a camera provided in a service station, and/or payment information for the refueling. The magnitude of the environmental burden caused by the identified fuel is specified so as to change, according thereto, a background color of an instrument panel of the vehicle. Also, a turn-on/turn-off state and a lighting color of an eco-lamp provided on a rear surface of the vehicle is changed. Thus, the appropriate vehicle information is provided in consideration of differences in the environmental burden depending on the used fuel even when the vehicle model is the same.

12 Claims, 10 Drawing Sheets

(51) Int. Cl.
    *B60L 53/65*          (2019.01)
    *B60Q 1/50*           (2006.01)
    *G06Q 30/0283*     (2023.01)
    *G06V 20/52*        (2022.01)

(52) U.S. Cl.
    CPC . *B60W 2050/146* (2013.01); *B60W 2510/244* (2013.01); *B60W 2530/209* (2020.02)

(56) References Cited

U.S. PATENT DOCUMENTS

| | | | | |
|---|---|---|---|---|
| 2012/0280804 A1* | 11/2012 | Matsumoto | ............ | B60L 53/14 340/425.5 |
| 2013/0293364 A1* | 11/2013 | Ricci | ............ | B60K 35/00 340/425.5 |
| 2015/0302670 A1* | 10/2015 | Ulrey | ............ | G01F 9/023 701/123 |

FOREIGN PATENT DOCUMENTS

| | | | | |
|---|---|---|---|---|
| JP | 2012224094 | * | 11/2012 | ............ B60K 35/00 |
| JP | 2018-206167 A | | 12/2018 | |

\* cited by examiner

VEHICLE INFORMATION PROVIDING SYSTEM

CROSS-REFERENCE TO RELATED APPLICATIONS

The present application claims priority under 35 U.S.C. § 119(a) to Japanese Patent Application No. 2022-075449, filed on Apr. 28, 2022. The contents of this application are incorporated herein by reference in its entirety.

TECHNICAL FIELD

The present invention relates to a vehicle information providing system. Especially, the present invention relates to a system for providing information on a vehicle having a driving force source (for example, an internal combustion engine) that can select and use a plurality of kinds of driving energy sources (for example, a plurality of kinds of fuels). In this specification, even when some driving energy sources have the same kind (for example, when they have the same name), if their production processes differ from each other, then they may be occasionally treated as different kinds of driving energy sources.

BACKGROUND ART

Conventionally, a system for providing vehicle information as disclosed in Patent Document 1 is known as a vehicle information providing system. In the vehicle information providing system disclosed in Patent Document 1, information on the $CO_2$ discharge amount for every vehicle model ($CO_2$ discharge amount information by vehicle model) is generated by a data center, and display information according to the $CO_2$ discharge amount information by vehicle model is displayed on a client terminal. In this way, it is possible to use the display information on the vehicle model when the vehicle of the same model is developed. It is also possible to estimate influence on the environment that is caused by each vehicle model based on the display information on the corresponding vehicle model.

PRIOR ART DOCUMENT

Patent Document
[Patent Document 1] JP 2018-206167 A

SUMMARY OF THE INVENTION

Problem to Be Solved by the Invention

However, in the case where a driving force source capable of selecting and using a plurality of kinds of driving energy sources is mounted on a vehicle, the actual $CO_2$ discharge amount may differ depending on the used driving energy source even when the vehicle model is the same. The vehicle information providing system according to Patent Document 1 generates, in advance, the information on the $CO_2$ discharge amount for every vehicle model. Thus, this system does not assume any changes in the $CO_2$ discharge amount depending on the driving energy source that is used for the vehicle of the same model.

In consideration of the above problem, the inventors of the present invention reached the present invention related to a system in order to provide appropriate information on a vehicle having a driving force source that can select and use a plurality of kinds of driving energy sources (for example, for providing appropriate information on environmental friendliness of the vehicle).

The change in a condition derived from the use of the different driving energy source (in the above-described case, the change in the $CO_2$ discharge amount) is not limited to the above-described case. It is supposed that many kinds of changes are caused depending on the traveling state of the vehicle (for example, changes in the vehicle traveling performance and/or the fuel consumption rate according to the kind of the driving energy source).

The present invention was made in consideration of the above circumstances, an object of which is to realize a vehicle information providing system for providing appropriate vehicle information.

Means for Solving the Problem

In order to resolve the problem and achieve the above object, the present invention relates to a vehicle information providing system for providing information on a vehicle having a driving force source capable of selecting and using a plurality of kinds of driving energy sources. The vehicle information providing system includes: a driving energy source information identifying section that identifies information on a driving energy source stored in a driving energy source storage part; an instruction information generating section that generates instruction information to instruct a providing state of vehicle information according to the information on the driving energy source identified by the driving energy source information identifying section; and an information providing section that changes the providing state of the vehicle information according to the instruction information generated by the instruction information generating section.

The concept of the term "vehicle" in the present invention includes mobility vehicles other than the automobiles. For example, the term "vehicle" includes various kinds of moving bodies such as an electric kick scooter.

With the above-described configuration, the instruction information generating section generates instruction information (i.e. instruction information to instruct the providing state of the vehicle information) according to the information on the driving energy source (i.e. driving energy source stored in the driving energy source storage part) identified by the driving energy source information identifying section. Then, the information providing section changes the providing state of the vehicle information according to the instruction information. Thus, it is possible to realize the providing state of the vehicle information (for example, information on whether the vehicle is an eco-friendly type or not) according to the information on the driving energy source (for example, information on the kind of the driving energy source and information on generation of the driving energy source). That is, it is possible to provide appropriate vehicle information in consideration of the fact that even when the vehicle model is the same, the condition (for example, impact to the environment) may differ depending on the kind of the used driving energy source.

Specific examples of the information providing sections are provided here. When the information providing section is an instrument panel provided in a cabin of the vehicle, the change in the providing state of the vehicle information may be a change in a display color of the instrument panel.

With the above-described configuration, it is possible to provide a vehicle driver with appropriate vehicle information on the condition that the driver recognizes, in advance, the relationship between the display color of the instrument panel and the condition derived from the driving energy source (for example, the magnitude of the environmental burden).

When the information providing section is a display lamp provided on an outer surface of the vehicle, the change in the providing state of the vehicle information may be at least one of: a change between a turn-on state and a turn-off state of the display lamp; and a change in a display color of the display lamp.

With the above-described configuration, it is possible to give appropriate vehicle information to the outside of the vehicle (for example, to passerby) on the condition that the relationship between the state of the display lamp and the condition derived from the driving energy source is commonly known.

Also when the information providing section is a vehicle body color changing section capable of changing a color of a body of the vehicle, the change in the providing state of the vehicle information may be a change in the color of the body of the vehicle by the vehicle body color changing section.

With the above-described configuration, it is possible to give appropriate vehicle information to the outside of the vehicle on the condition that the relationship between the vehicle body color and the condition derived from the driving energy source is commonly known.

Specific examples of the driving force sources and the driving energy sources are provided here. When the driving force source is an internal combustion engine, the driving energy source is a fuel used for driving the internal combustion engine. Also, when the driving force source is an electric motor, the driving energy source is electric power used for driving the electric motor.

With the above-described configurations, it is possible to specifically identify the driving energy source and furthermore to obtain an appropriate providing state of the vehicle information according to the information on the driving energy source.

Also, the driving energy source information identifying section identifies the information on the driving energy source when the driving energy source storage part of the vehicle is refueled with the driving energy source in a service station.

With the above-described configuration, it is possible to change the providing state of the vehicle information of the information providing section to the state corresponding to the information on the supplied driving energy source during refueling of the driving energy source storage part with the driving energy source or when the refueling is completed. Thus, it is possible to early realize an appropriate providing state of the vehicle information, which also can prevent continuous indication of the providing state of the vehicle information (inappropriate vehicle information) that is derived from the information on the driving energy source previously supplied to the driving energy source storage part (for example, the driving energy source already consumed to a certain extent).

Also, the service station is provided with a camera that takes images of a refueling operation to refuel the driving energy source storage part of the vehicle with the driving energy source. The driving energy source information identifying section receives information on the images of the refueling operation taken by the camera, and identifies the information on the driving energy source stored in the driving energy source storage part based on the received information on the taken images.

With the above-described configuration, it is possible to identify, with high reliability, the information on the driving energy source by the driving energy source information identifying section, which also results in high reliability of the provided vehicle information.

Also, the driving energy source information identifying section receives payment information after completion of the refueling of the driving energy source storage part of the vehicle with the driving energy source so as to calculate a unit price of the driving energy source by the payment information, and identifies the information on the driving energy source stored in the driving energy source storage part based on the unit price.

The above configuration is to determine the driving energy source stored in the driving energy source storage part taking into account the fact that each driving energy source has a different unit price (price per unit amount). With this configuration also, it is possible to identify, with high reliability, the information on the driving energy source by the driving energy source information identifying section, which also results in high reliability of the provided vehicle information.

Also, the driving energy source information identifying section receives information on generation of the driving energy source with which the driving energy source storage part of the vehicle is refueled, and identifies the information on the driving energy source stored in the driving energy source storage part based on the received generation information.

The above configuration is to provide the vehicle information in consideration of the condition when the driving energy source is generated. For example, the magnitude of the environmental burden when generating the driving energy source is also provided as the vehicle information. That is, even when the driving energy sources (fuels) have the same name and their respective environmental burdens when they are used (for example, combusted as fuel) are equivalent (equivalent in, for example, the $CO_2$ discharge amount), the LCA (Life Cycle Assessment) still differs from each other between the fuel generated in the condition in which the environmental burden is large and the fuel generated in the condition in which the environmental burden is small. With this configuration, it is possible to provide the vehicle information reflecting the above condition, which leads to further detailed vehicle information.

Also, the system of the present invention is not limited to that using the information from the outside such as a service station. The vehicle itself may identify, by inside information of the vehicle, the information on the driving energy source. Specifically, the driving energy source information identifying section may identify the information on the driving energy source stored in the driving energy source storage part based on an output value of an on-vehicle sensor when the driving force source is driven.

With the above-described configuration, it is possible to identify the information on the driving energy source not using the information from the outside such as the service station. In other words, it is possible to provide appropriate vehicle information without communicating with the outside (such as the service station).

More specifically, the on-vehicle sensor identifies the information on the driving energy source stored in the driving energy source storage part based on an amount of specific substance contained in gas exhausted by driving the driving force source.

The system of the present invention is to identify the information on the driving energy source in consideration of the fact that the amount of specific substance (for example, PM discharge amount) contained in the exhaust gas differs depending on the fuel as the driving energy source when, for example, the driving force source is an internal combustion engine. In this way, it is possible to identify the information on the driving energy source by effectively using the existing on-vehicle sensor (for example, the PM sensor).

Also, the information on the driving energy source is any one of: information on magnitude of an environmental burden when the driving energy source is used; information correlated with the magnitude of the environmental burden when the driving energy source is used; information on the magnitude of the environmental burden when the driving energy source is generated; and information correlated with the magnitude of the environmental burden when the driving energy source is generated.

Here, examples of the information on the magnitude of the environmental burden include the information directly indicates the magnitude of the environmental burden such as a $CO_2$ discharge amount per unit amount when the driving energy source is used, and a $CO_2$ discharge amount per unit generation amount when the driving energy source is generated. Examples of the information correlated with the magnitude of the environmental burden include the information indirectly indicates the magnitude of the environmental burden such as the name and the generating method of the driving energy source.

With the above-described configuration, it is possible to provide, as the vehicle information from the information providing section, the influence of the used driving energy source on the environment (the magnitude of the environmental burden) or the influence of the driving energy source on the environment when it was generated. Therefore, when the vehicle information is provided to the cabin of the vehicle (for example, when the display color of the instrument panel is changed as described above), it is possible for a driver to be conscious of driving for decreasing the environmental burden (i.e. driving without sudden start and sudden acceleration), or to be conscious of his/her high social status. Also, when the vehicle information is provided to the outside of the vehicle (for example, when the state of the display lamp is changed and/or when the vehicle body color is changed as described above), it is possible to demonstrate, to the outside, eco-friendliness and high quality of the vehicle.

Advantageous Effects of the Invention

In the present invention, the information on the driving energy source stored in the driving energy source storage part is identified. Then, the instruction information corresponding to the information on the identified driving energy source is generated and thus the providing state of the vehicle information of the information providing section is changed according to the instruction information. In this way, it is possible to obtain the providing state of the vehicle information corresponding to the information on the driving energy source. Thus, it is possible to provide appropriate vehicle information in consideration of the fact that even when the vehicle model is the same, the condition may differ depending on the kind of the used driving energy source.

DESCRIPTION OF EMBODIMENTS

Hereinafter, an embodiment of the present invention will be described with reference to the drawings. In this embodiment of a vehicle having an internal combustion engine (driving force source), a case is exemplarily described, in which a display state (i.e. a providing state of vehicle information) in a display part (information providing section) inside/outside the vehicle is changed depending on the kind of fuel (driving energy source) stored in a fuel tank (driving energy source storage part).

The vehicle information providing system according to this embodiment is constructed by a service station and a vehicle. The service station is capable of providing a plurality of kinds of fuels. Also, the vehicle constructing the vehicle information providing system has an internal combustion engine (diesel engine) that can use a plurality of kinds of fuels (for example, a diesel fuel and an e-diesel, described later) among the fuels provided in the service station. That is, the vehicle can be driven by both of the diesel fuel and the e-diesel.

Service Station

Figure 1:
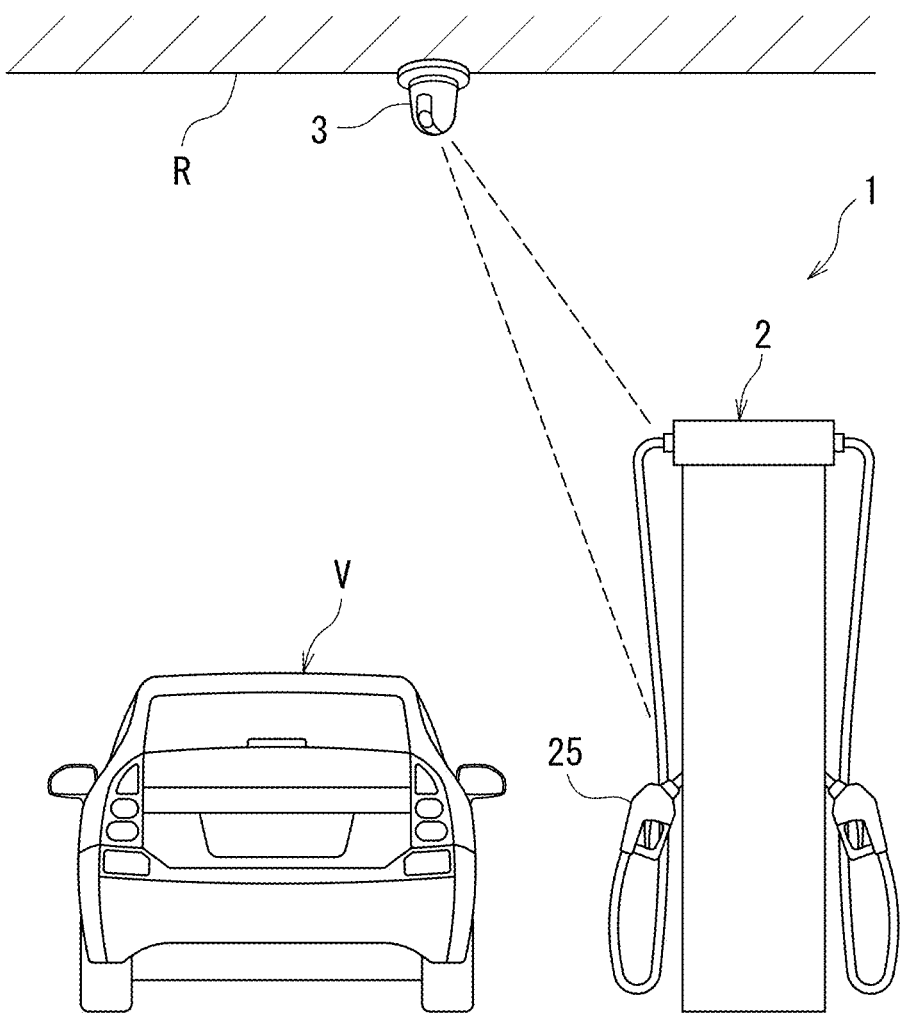
FIG. 1 is a diagram illustrating a state in which a vehicle is being stopped for refueling in front of a fueling machine provided in a service station according to an embodiment.
Figure 2:
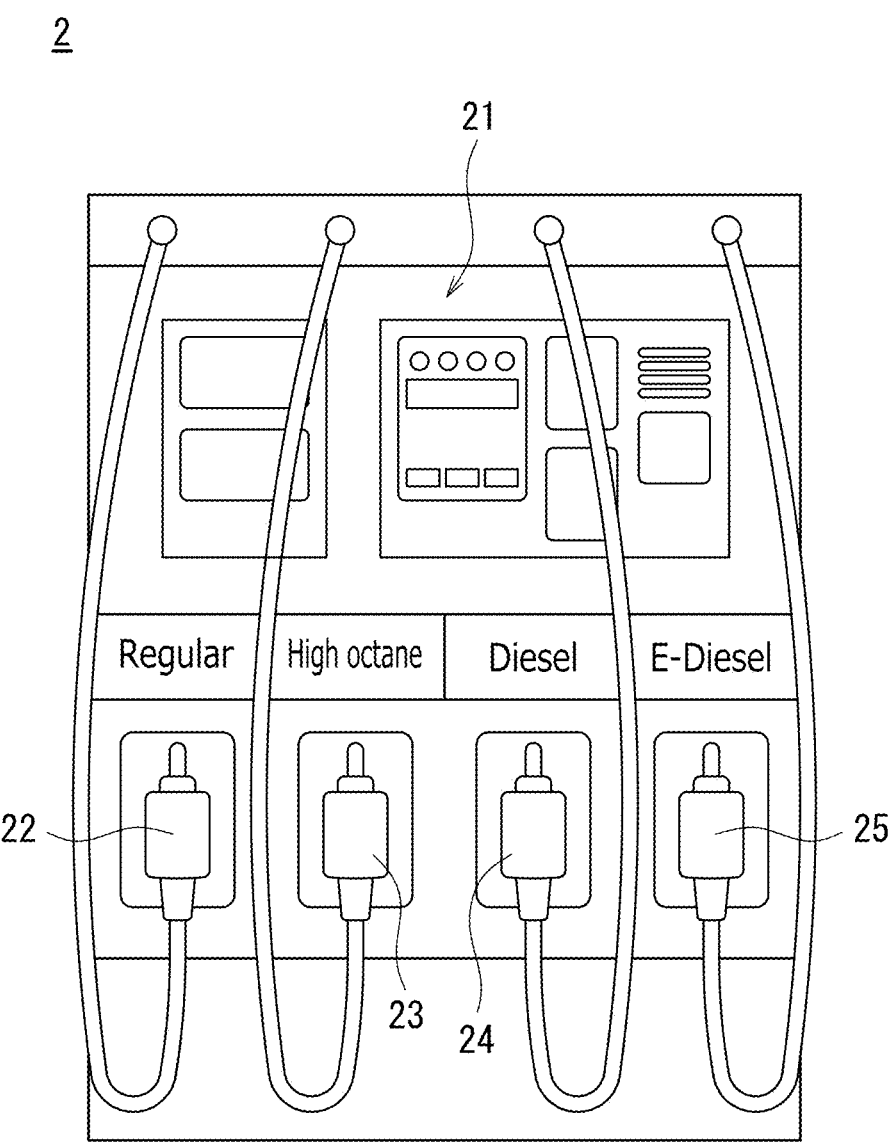
FIG. 2 is a front view illustrating the fueling machine according to the embodiment.

FIG. 1 is a diagram illustrating a state in which a vehicle V is being stopped for refueling in front of a fueling machine (fuel dispenser) 2 provided in a service station SS that constructs a vehicle information providing system 1 according to this embodiment. Also, FIG. 2 is a front view illustrating the fueling machine 2.

As shown in these Figures, the fueling machine 2 allows a refueling person to select the fuel for refueling the vehicle V among a regular gasoline, a high octane gasoline, a diesel fuel and an e-diesel (synthetic fuel). The diesel fuel and the e-diesel are selectively used for refueling the vehicle V having a diesel engine (hereinafter, occasionally referred to as simply an "engine").

As is commonly known, the e-diesel is a synthetic fuel constituted of assemblies of a plurality of hydrocarbon compounds generated by synthesizing $CO_2$ and $H_2$, which causes a low environmental burden when it is combusted (i.e. it has a small $CO_2$ discharge amount compared to the diesel fuel). When generating the e-diesel, $H_2$ is produced by electrolyzing water. However, the environmental burden may increase depending on energy to generate electricity (power generation) to be used for the production of $H_2$ (i.e. the LCA score of the e-diesel may become high). For example, when $H_2$ is produced using the electric power generated by the thermal power generation, the environmental burden tends to increase due to increase of the $CO_2$ discharge amount at the time of generating the electric power. In contrast to the above, when $H_2$ is produced using the electric power generated by the power generation using renewable energy such as the wind power generation, the photovoltaic power generation and the geometrical power generation, the environmental burden can be reduced since the $CO_2$ discharge amount is reduced at the time of generating the electric power. Thus, it is preferable to produce $H_2$ for generation of the e-diesel by the power generation using the renewable energy. When a fuel is called as an e-diesel, a public known e-gasoline, or an e-fuel as a collective term, such a fuel is generally generated using $H_2$ produced by the electric power generated by the renewable energy.

The fueling machine 2 is provided with respective fuel filling nozzles 22, 23, 24 and 25 for each type of fuel. Also the fueling machine 2 is provided with an operation panel 21 including a touch screen liquid crystal display for selecting a fuel to put. Thus, a refueling person (i.e. an operator in the service station SS, or a driver of the vehicle V when the service station SS is a self-service gas station) selects a fuel to put by operating the operation panel 21 and holds one of the fuel filling nozzles 22, 23, 24 and 25 corresponding to the selected fuel (kind of fuel) to refuel the vehicle V through a gas port thereof.

As shown in FIG. 1, a camera (monitoring camera) 3 is installed in the service station SS according to this embodiment so as to take images of the operation panel 21 of the fueling machine 2 and its vicinities. For example, the camera 3 is provided on a lower surface of a roof R above the fueling machine 2 (a roof R of the service station SS, also called as a canopy). When a plurality of fueling machines 2 is provided in the service station SS, a plurality of cameras 3 may be provided such that each camera 3 serves as an exclusive camera for a corresponding fueling machine 2 (specifically, one fueling machine 2 may have one camera 3). Alternatively, one camera 3 may take images of the operation panels 21 of the multiple fueling machines 2.

Vehicle

Here, a description is given on the vehicle V applied to this embodiment. On this vehicle V, a diesel engine is mounted as the driving force source. As described above, the diesel engine can use, as a fuel, a diesel fuel and an e-diesel. The refueling person can arbitrarily select a fuel to put from the diesel fuel and the e-diesel. Thus, when refueling the vehicle V with the diesel fuel, the refueling person selects the diesel fuel by operating the operation panel 21 of the fueling machine 2, and holds the fuel filling nozzle 24 of the diesel fuel to refuel the vehicle V through the gas port thereof. Also, when refueling the vehicle V with the e-diesel, the refueling person selects the e-diesel by operating the operation panel 21 of the fueling machine 2, and holds the fuel filling nozzle 25 of the e-diesel to refuel the vehicle V through the gas port thereof.

Figure 3A:
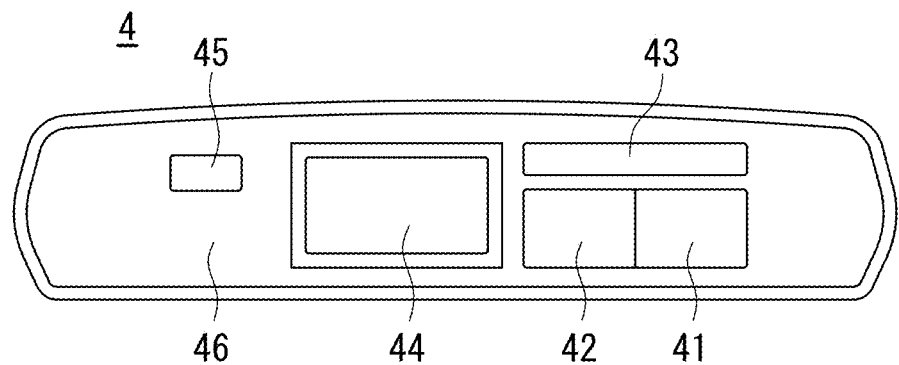
FIG. 3A is a diagram indicating a first display state of an instrument panel in a cabin of a vehicle.

In the vehicle V applied to this embodiment, it is possible to change the background color of the instrument panel provided in the front of the front seats in the vehicle cabin. FIG. 3A indicates one example of an instrument panel 4. As shown in FIG. 3A, the instrument panel 4 is configured as a color liquid crystal screen. Display areas exemplarily listed below are disposed in the instrument panel 4: a vehicle speed display area 41; a gearshift position display area 42; a fuel gauge area 43; an energy monitor area 44; and a clock display area 45. The remaining area other than the above areas is a background area 46. Since the respective display states of the vehicle speed display area 41, the gearshift position display area 42, the fuel gauge area 43, the energy monitor area 44 and the clock display area 45 are publicly known, the description thereof is omitted here.

The background area 46 can be switched, for example, between three-color displays (i.e. changes in the providing state of the vehicle information in the present invention). For example, a plurality of kinds of LED elements (not shown) is arranged on a part or the whole of the background area 46 in order to display the background area, and three display states as described below can be switched between one another: a first display state in black color (color of the turn-off state) by not supplying power to the LED elements; a second display state with the background (the background area 46) in blue color by supplying power to and turning on the blue LED elements constituting the background area 46; and a third display state with the background (the background area 46) in green color by supplying power to and turning on the green LED elements constituting the background area 46 (this switch of the background color is described in detail later). In place of using the LED elements corresponding to the respective colors, the LED elements that emit white light may be arranged for displaying the background area so as to transmit the light from the LED elements through a color filter (i.e. selecting the LED elements to emit the light by arranging them to correspond to the color filter of each color) in order to change the background color of the instrument panel 4. The range and the color of the background area 46 (i.e. the background color) is set in advance so as not to reduce the visibility of the areas 41, 42, 43, 44 and 45 other than the background 46. Also, the color in each display state is not limited to the above color, it may be appropriately set.

Figure 4A:
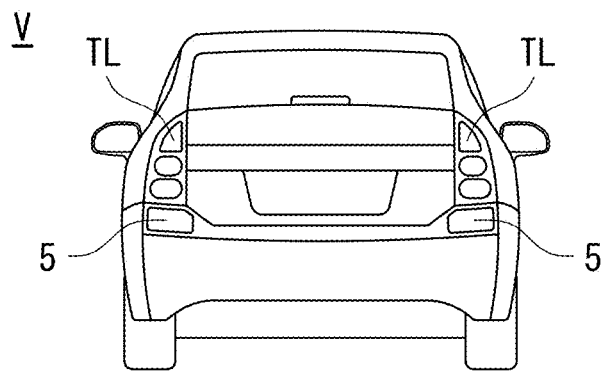
FIG. 4A is a diagram indicating a first display state of an eco-lamp provided on a rear surface of a vehicle.

Also as shown in FIG. 4A, the vehicle V applied to this embodiment includes an eco-lamp 5 (a display lamp in the present invention) provided on its rear surface. The eco-lamp 5 is provided under a tail lamp TL provided on the rear surface of the vehicle V. The eco-lamp 5 can also be switched between, for example, three-color displays (i.e. changes in the providing state of the vehicle information in the present invention). For example, a plurality of kinds of LED elements (not shown) is arranged in order to display the eco-lamp 5, and three display states as described below can be switched between one another: a first display state in black or white color (color of the turn-off state) by not supplying power to the LED elements; a second display state with the eco-lamp 5 in blue color by supplying power to and turning on the blue LED elements constituting the eco-lamp 5; and a third display state with the eco-lamp 5 in green color by supplying power to and turning on the green LED elements constituting the eco-lamp 5 (this switch of the eco-lamp 5 is also described in detail later). In this case also, in place of using the LED elements corresponding to the respective colors, the LED elements that emit white light may be used as the eco-lamp 5 so as to transmit the light from the LED elements through a color filter (i.e. selecting the LED elements to emit the light by arranging them to correspond to the color filter of each color) in order to change the color of the eco-lamp 5. The color in each display state is not limited to the above color, it may be appropriately set. Furthermore, the color and the light intensity of the eco-lamp 5 are set in advance such that no false recognition is caused between the turning on the eco-lamp 5 and the lighting of the brake light and/or the backup light constituting the tail lamp TL. As to the position where the eco-lamp 5 is located, it is not limited to the rear surface of the vehicle V, but may be appropriately set. For example, it may be provided under the headlight of the front surface of the vehicle V, or may be provided on the side surface of the vehicle V. In addition, the number of eco-lamps 5 to be provided may be appropriately set.

Vehicle Information Providing System

Figure 5:
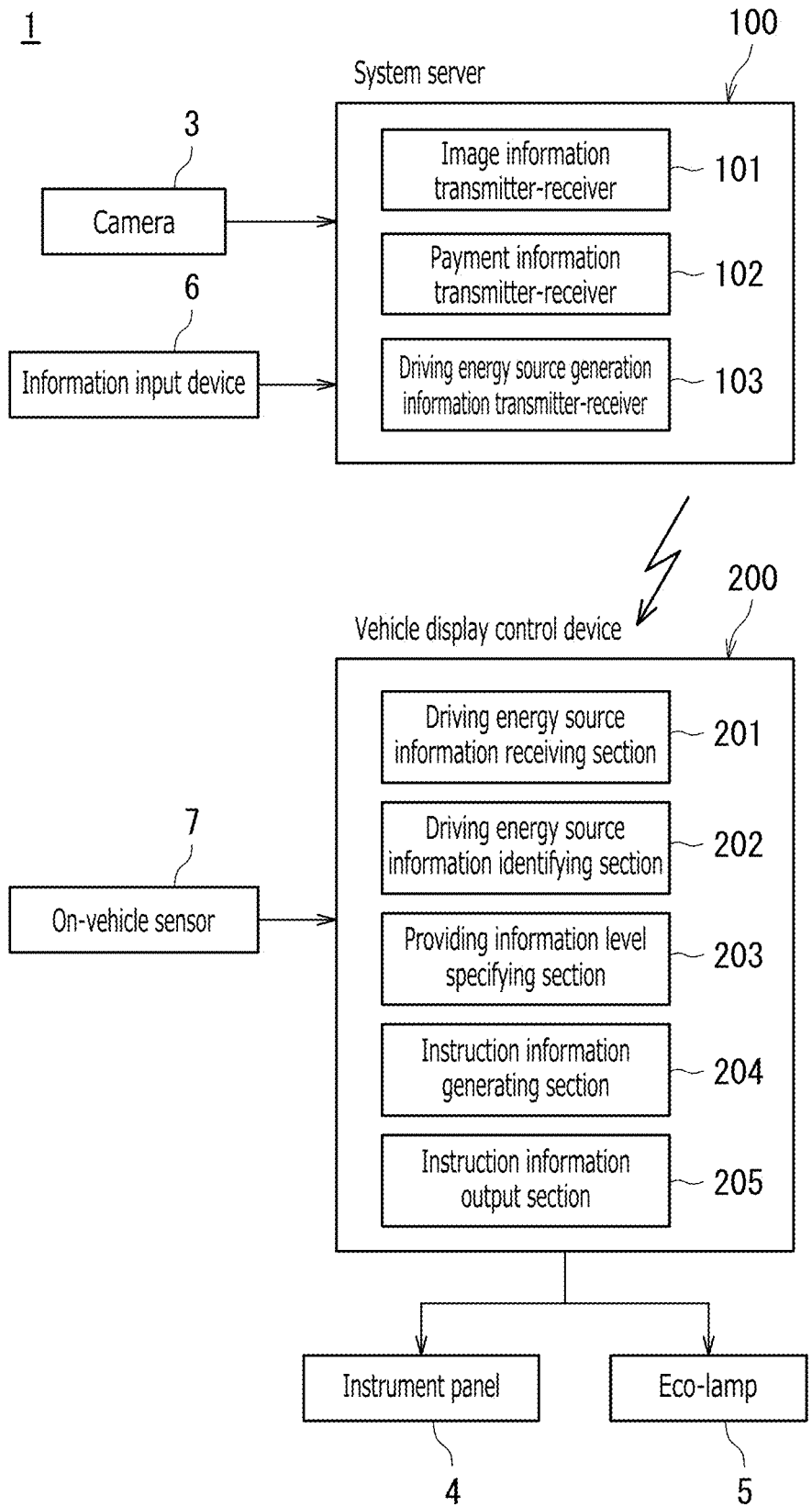
FIG. 5 is a block diagram indicating a vehicle information providing system according to the embodiment.

Here, the vehicle information providing system 1 according to this embodiment is described. FIG. 5 is a block diagram of the vehicle information providing system 1. As shown in FIG. 5, the vehicle information providing system 1 includes: a system server 100 provided in the service station SS; and a vehicle display control device 200 provided in the vehicle V.

(System Server)

The system server 100 includes, for example: a processor such as a CPU (Central Processing Unit); a ROM (Read-Only Memory) to store control programs; and a RAM (Random-Access Memory) to temporarily store data; and an input/output port.

To the system server 100, the camera 3 described above and an information input device 6 described later are connected so as to send/receive information. Also, the system server 100 includes, as function sections to be executed by the control programs: an image information transmitter-receiver 101; a payment information transmitter-receiver 102; and a driving energy source generation information transmitter-receiver 103.

The image information transmitter-receiver 101 receives information on images taken by the camera 3 (i.e. image information on the operation panel 21 of the fueling machine 2 and its vicinities), and transmits the received image information to the vehicle display control device 200 of the vehicle V. More specifically, the image information at the time of refueling of the vehicle V is transmitted to the vehicle display control device 200 of the vehicle V, which includes image information on an operation state of the operation panel 21 of the fueling machine 2, and on which fuel filling nozzle is used.

In this case, even when a plurality of fueling machines 2 is provided in the service station SS, it is required that the vehicle V that is refueled by the fueling machine 2 corresponding to the image information (i.e. the fueling machine 2 in the image taken by the camera 3) is a vehicle V that receives the image information (i.e. the vehicle V including the vehicle display control device 200 that receives the image information).

For this reason, the communication between the system server 100 and the vehicle display control device 200 is performed by a communication mode capable of identifying the vehicle V that receives and uses the image information. For example, when one camera 3 is provided with respect to one fueling machine 2, the stop area of the vehicle V to be refueled is identified (i.e. a space range just for one vehicle in front of the fueling machine 2 is identified as the stop area) so as to associate, in advance, this stop area with the camera 3 as a sender of the image information. Thus, since the image information on only the stop area corresponding to the camera 3 as the sender of the image information is transmitted, the vehicle V that is being refueled by the fueling machine 2 corresponding to the image information coincides with the vehicle V that receives the image information. Also, when one camera 3 can take respective operation panels 21 of a plurality of fueling machines 2, the system server 100 acquires individual information (ID information) of the vehicle V at the time of starting the refueling (for example, the individual information is acquired by short-range wireless communication) so as to associate/link this individual information with/to the image information to be transmitted. Thus, the vehicle display control device 200 of the vehicle V that receives the image information can determine whether the received image information corresponds to the refueling of the vehicle itself, and thus can extract only the image information corresponding to the refueling of the vehicle itself (that is, deletes the image information corresponding to the other vehicles).

The payment information transmitter-receiver 102 receives information on making a payment (payment of the fee) by the driver after the refueling of the vehicle V (i.e. information on the supplied amount and on the payment amount), and transmits the payment information to the vehicle display control device 200 of the vehicle V. That is, the payment information transmitter-receiver 102 receives the information on the supplied amount and on the payment amount recognized by the payment function section provided in the system server 100, and further transmits the received information to the vehicle display control device 200 of the vehicle V. Generally, each fuel has a different unit price (price per unit amount), and the unit price of the fuel can be calculated using the information on the supplied amount and on the payment amount. In this way, it is possible to obtain the kind of the fuel with which the vehicle V is refueled.

In this case also, even when a plurality of fueling machines 2 is provided in the service station SS, it is required that the vehicle V that is refueled by the fueling machine 2 corresponding to the payment information (i.e. the fueling machine 2 for which the payment is made in the results of the refueling) is a vehicle V that receives the payment information (i.e. the vehicle V including the vehicle display control device 200 that receives the payment information). Therefore, the vehicle V refueled by the fueling machine 2 corresponding to the payment information coincides with the vehicle V that receives the payment information, by the configuration similar to the above-described case in which the image information is sent from the image information transmitter-receiver 101.

The driving energy source generation information transmitter-receiver 103 receives information on generation of the fuel (driving energy source) with which the vehicle V is refueled. The system server 100 includes the information input device 6 that is provided in the service station SS so that the operator in the service station SS can input the information to the information input device 6. The information that is input to the information input device 6 is individual pieces of information of the respective kinds of fuels, which include the unit price and the fuel generation information. The unit price is a price per unit amount as described above, and can be arbitrarily set. The fuel generation information is information on production process of the fuel. For example, in the case where the e-diesel is generated, $H_2$ is produced by electrolyzing water. The fuel generation information corresponds to information on whether the energy for generating electric power (power generation) for producing $H_2$ is renewable energy or not. That is, the index of the magnitude of the environmental burden at the time of generation of the e-diesel is input to the information input device 6 as the fuel generation information (corresponding to the information on LCA of the fuel).

More specifically, the operator in the service station SS may acquire the fuel generation information from a primary distributor or the like of the fuel so as to input, by a keyboard of the information input device 6, the fuel generation information (for example, the value as the index of the magnitude of the environmental burden). Alternatively, the fuel generation information may be embedded in the two-dimensional code or the three-dimensional code added to a delivery slip from the primary distributor of the fuel so that the information is read by a code reader and is input to the information input device 6. The fuel generation information that is input to the information input device 6 as described above is transmitted from the information input device 6 to the driving energy source generation information transmitter-receiver 103. Also, information on the unit price of the fuel that is input to the information input device 6 is transmitted from the information input device 6 to the payment information transmitter-receiver 102.

(Vehicle Display Control Device)

Similarly to the system server 100, the vehicle display control device 200 includes, for example: a processor such as a CPU; a ROM to store control programs; and a RAM to temporarily store data; and an input/output port.

Also, the vehicle display control device 200 includes, as function sections to be executed by the control programs: a driving energy source information receiving section 201; a driving energy source information identifying section 202; a providing information level specifying section 203; an instruction information generating section 204; and an instruction information output section 205.

The driving energy source information receiving section 201 receives: image information from the image information transmitter-receiver 101 (image information on the operation state of the operation panel 21 of the fueling machine 2 and on which fuel filling nozzle is used, at the time of the refueling of the vehicle V); payment information from the payment information transmitter-receiver 102 (information on making a payment by the driver after the refueling of the vehicle V, i.e. information on the supplied amount and on the payment amount); and driving energy source generation information from the driving energy source generation information transmitter-receiver 103 (information on the unit price, the fuel generation information, etc.).

Also, the driving energy source information receiving section 201 receives information on an output value (hereinafter occasionally referred to as "sensor output") of a sensor 7 mounted on the vehicle V (hereinafter occasionally referred to as an "on-vehicle sensor"), which is the sensor output whose output property changes depending on the kind of the fuel. Now, the description is given in detail. Here, a PM sensor is exemplarily explained, which is provided in an exhaust system of a diesel engine as the on-vehicle sensor 7.

Figure 6:
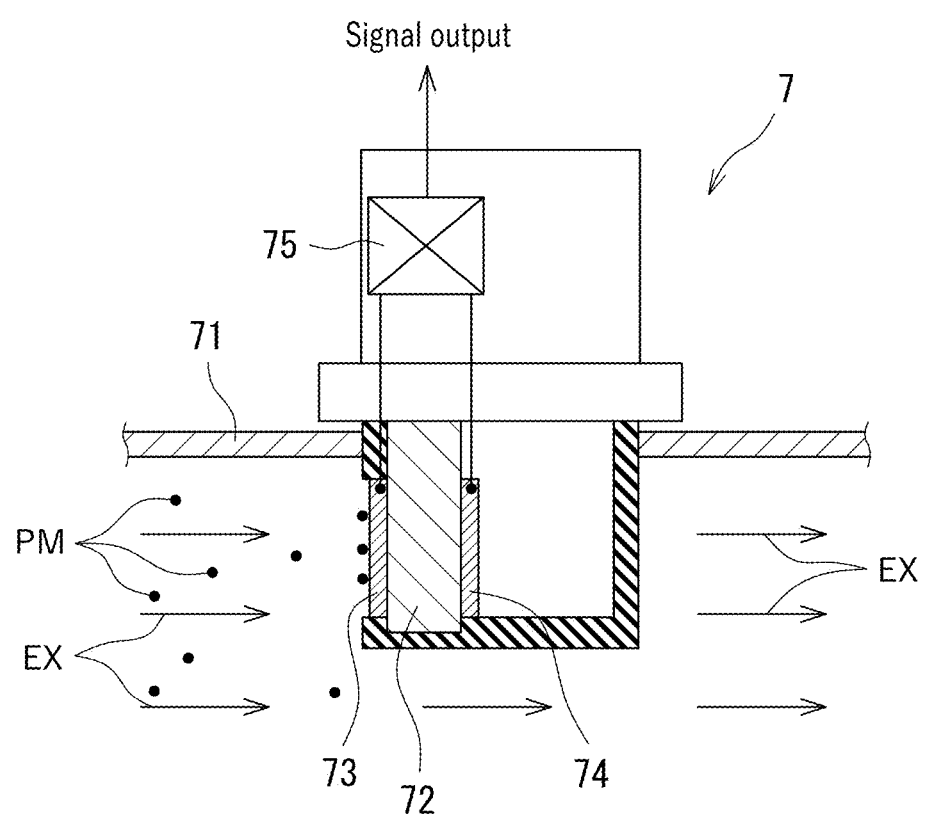
FIG. 6 is a diagram schematically indicating a configuration of a PM sensor provided in an exhaust system of a vehicle.

FIG. 6 is a diagram schematically indicating a configuration of the PM sensor (on-vehicle sensor) 7 provided in the exhaust system. As shown in FIG. 6, an exhaust pipe 71 is provided with the PM sensor 7 capable of measuring the concentration of particulate matter (hereinafter referred to as "PM") contained in the exhaust (exhaust gas). In the present invention, the PM is a specific substance that is contained in the gas exhausted due to driving of the driving force source. The PM sensor 7 includes a proton conductor 72 inside the exhaust pipe 71 so as to receive the exhaust flow EX. On one side (on the left side in FIG. 6) of the proton conductor 72, a measuring electrode 73 is disposed, and on the other side thereof is provided a reference electrode 74. A predetermined voltage is applied between the two electrodes 73 and 74 from an electric circuit 75. Thus, when the PM contained in the exhaust adheres to the measuring electrode 73, a signal according to the adhesion amount is output. That is, when the PM that adheres to the surface of the measuring electrode 73 is consumed by the electrochemical reaction, protons are generated and move inside the proton conductor 72 toward the other surface. In this way, the current flows between the measuring electrode 73 and the reference electrode 74, and the signal corresponding to the current value is output from the electric circuit 75. The PM sensor 7 may also be a resistance measurement type that detects changes in the resistance value due to the PM that deposits between one pair of electrodes.

Figure 7:
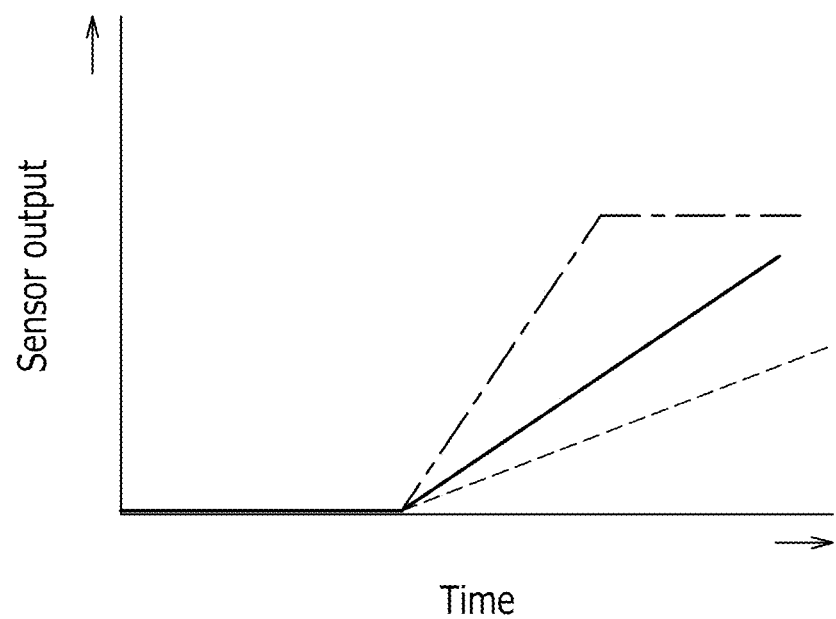
FIG. 7 is a graph indicating an example of changes in sensor output of the PM sensor depending on the kinds of fuels.

In the diesel engine, the PM discharge amount is generally reduced when the e-diesel is used, compared to the case where the diesel fuel is used. For this reason, the sensor output of the PM sensor 7 tends to be smaller when the e-diesel is used than when the diesel fuel is used. FIG. 7 is a graph indicating an example of changes in sensor output of the PM sensor 7 according to the kinds of fuels. In FIG. 7, the long-dashed short-dashed line indicates one example of changes in the sensor output when only the diesel fuel is stored in the fuel tank, the solid line indicates one example of changes in the sensor output when both the diesel fuel and the e-diesel are stored in the fuel tank, and the dashed line indicates one example of changes in the sensor output when only the e-diesel is stored in the fuel tank. As can be seen from the graph, after elapse of a predetermined period of time from the start of driving the diesel engine, the gradient of change in the sensor output (i.e. the increment of the sensor output with time passage) tends to decrease as the percentage of the e-diesel with respect to the total fuels increases. Therefore, the gradient of change in the sensor output indicated by the solid line in FIG. 7 differs depending on the ratio of the diesel fuel and the e-diesel in the fuel tank.

The driving energy source information identifying section 202 identifies the kind of the fuel with which the vehicle V is refueled based on various kinds of information received by the driving energy source information receiving section 201. For example, when the vehicle V is refueled with the diesel fuel, it is determined, based on the image information from the image information transmitter-receiver 101, that the diesel fuel is selected on the operation panel 21 of the fueling machine 2 and that the refueling is performed by the fuel filling nozzle 24 of the diesel fuel. Thus, the unit price of the fuel calculated based on the payment information from the payment information transmitter-receiver 102 corresponds to the unit price of the diesel fuel. The above determination based on the image information is performed using well-known image matching processing or the like. Thus, after elapse of the predetermined period of time from the start of driving the diesel engine, the gradient of change in the sensor output of the PM sensor 7 is obtained as that corresponding to the diesel fuel. On the other hand, when the vehicle V is refueled with the e-diesel, it is determined, based on the image information from the image information transmitter-receiver 101, that the e-diesel is selected on the operation panel 21 of the fueling machine 2 and that the refueling is performed by the fuel filling nozzle 25 of the e-diesel. Thus, the unit price of the fuel calculated based on the payment information from the payment information transmitter-receiver 102 corresponds to the unit price of the e-diesel. Also, the level of magnitude of the environmental burden when producing the e-diesel is specified based on the fuel generation information from the driving energy source generation information transmitter-receiver 103. This level of magnitude of the environmental burden is, for example, a level based on the information on whether the energy for generating the electric power used for producing $H_2$ is renewable energy or not. After elapse of the predetermined period of time from the start of driving the diesel engine, the gradient of change in the sensor output of the PM sensor 7 is obtained as that corresponding to the e-diesel. In the case where the diesel fuel remains in the fuel tank, the gradient of change in the sensor output of the PM sensor 7 is obtained as that according to the mixing ratio of the diesel fuel and the e-diesel.

The providing information level specifying section 203 specifies the level of impact to the environment (providing information level) by the fuel identified by the driving energy source information identifying section 202 (i.e. the kind of the fuel used for refueling the vehicle V). In this embodiment, this level is specified as one of the three levels.

First, when the fuel identified by the driving energy source information identifying section 202 is a diesel fuel, the providing information level specifying section 203 specifies the providing information level as "level 1". "Level 1" means that the fuel in this level causes the largest environmental burden out of the fuels used for the diesel engine (i.e. the diesel fuel and the e-diesel). More specifically, when it is determined that the fuel is a diesel fuel by both the fuel determination operation based on the image information from the image information transmitter-receiver 101 and the fuel determination operation based on the payment information from the payment information transmitter-receiver 102, the providing information level specifying section 203 specifies the providing information level as "level 1". When the kind of the fuel is determined to be a diesel fuel by one of the above determination operations but the kind is not determined by the other of the above determination operations, the providing information level specifying section 203 may also specify the providing information level as "level 1".

Next, when the fuel identified by the driving energy source information identifying section 202 is an e-diesel, the providing information level specifying section 203 specifies the providing information level as "level 2" on the condition that the fuel generation information transmitted from the driving energy source generation information transmitter-receiver 103 includes information that the electric power used for producing $H_2$ by electrolyzing water is generated by the energy other than the renewable energy. "Level 2" means that the fuel in this level causes an environmental burden smaller than the case in which the fuel used for the diesel engine is the diesel fuel.

Furthermore, when the fuel identified by the driving energy source information identifying section 202 is an e-diesel, the providing information level specifying section 203 specifies the providing information level as "level 3" on the condition that the fuel generation information transmitted from the driving energy source generation information transmitter-receiver 103 includes information that the electric power used for producing $H_2$ by electrolyzing water is generated by the renewable energy. "Level 3" means that the fuel in this level causes the smallest environmental burden out of the fuels used for the diesel engine. In this case, it is determined that the fuel is an e-diesel when the result that the fuel is an e-diesel is obtained by both the fuel determination operation based on the image information from the image information transmitter-receiver 101 and the fuel determination operation based on the payment information from the payment information transmitter-receiver 102 (the providing information level is specified as "level 2" or "level 3"). When the kind of the fuel is determined to be an e-diesel by one of the above determination operations but the kind is not determined by the other of the above determination operations, it may also be identified that the fuel is an e-diesel (the providing information level is specified as "level 2" or "level 3").

The instruction information generating section 204 generates instruction information to instruct the providing state of the information according to the providing information level specified by the providing information level specifying section 203. More specifically, the instruction information generating section 204 generates instruction information on the background color of the instrument panel 4 and instruction information on the eco-lamp 5.

Figure 3B:
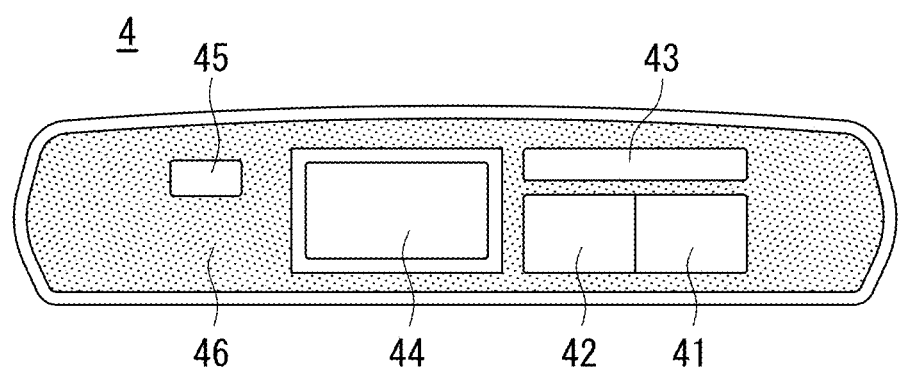
FIG. 3B is a diagram indicating a second display state of the instrument panel in the cabin of the vehicle.
Figure 3C:
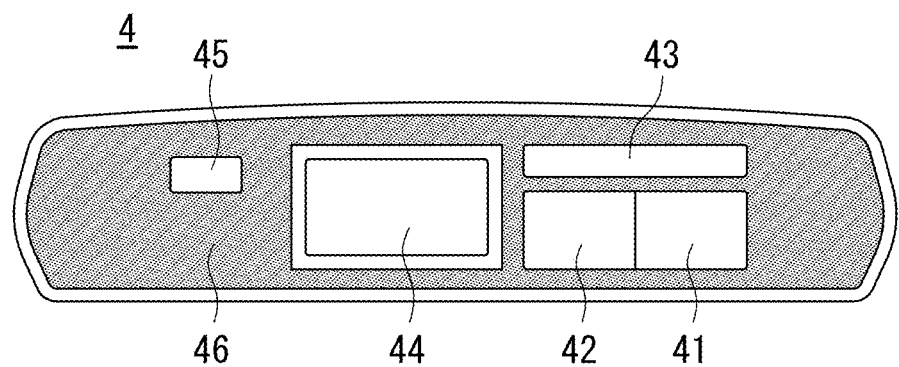
FIG. 3C is a diagram indicating a third display state of the instrument panel in the cabin of the vehicle.

As the instruction information on the background color of the instrument panel 4, when the providing information level is specified as "level 1", the instruction information generating section 204 generates instruction information to display the first display state (i.e. the first display state in black color (color of the turn-off state) by not supplying power to the LED elements). In this case, the instrument panel 4 is in the first display state as shown in FIG. 3A. In FIG. 3A, the color of the turn-off state is indicated as the colorless background area 46. Also, when the providing information level is specified as "level 2", the instruction information generating section 204 generates instruction information to display the second display state (i.e. the second display state with the background (the background area 46) in blue color by supplying power to and turning on the blue LED elements constituting the background area 46). In this case, the instrument panel 4 is in the second display state as shown in FIG. 3B. In FIG. 3B, the blue color is indicated as a dotted background area 46. Furthermore, when the providing information level is specified as "level 3", the instruction information generating section 204 generates instruction information to display the third display state (i.e. the third display state with the background (the background area 46) in green color by supplying power to and turning on the green LED elements constituting the background area 46). In this case, the instrument panel 4 is in the third display state as shown in FIG. 3C. In FIG. 3C, the green color is indicated as a further densely dotted background area 46 compared to the back ground area 46 in FIG. 3B.

Figure 4B:
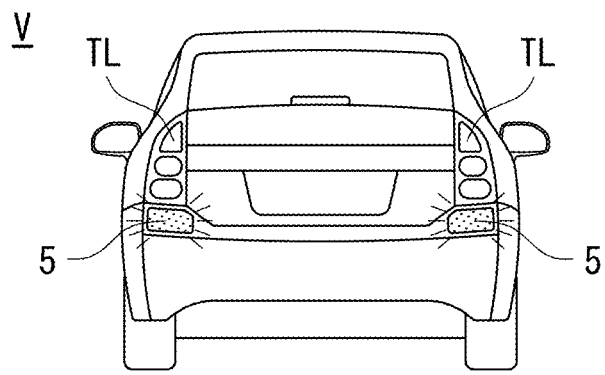
FIG. 4B is a diagram indicating a second display state of the eco-lamp provided on the rear surface of the vehicle.
Figure 4C:
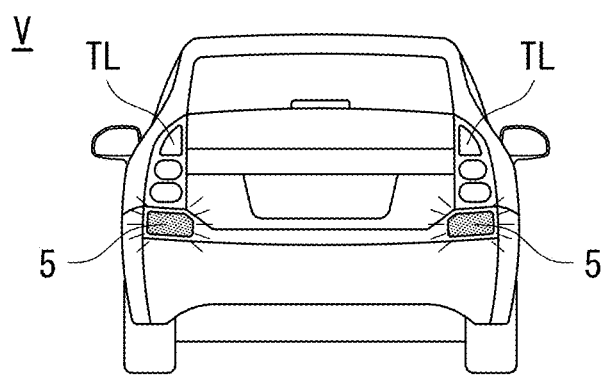
FIG. 4C is a diagram indicating a third display state of the eco-lamp provided on the rear surface of the vehicle.

Also, as the instruction information to the eco-lamp 5, when the providing information level is specified as "level 1", the instruction information generating section 204 generates instruction information to display the first display state (i.e. the first display state in black or white color (color of the turn-off state) by not supplying power to the LED elements constituting the eco-lamp 5). In this case, the eco-lamp 5 is in the first display state as shown in FIG. 4A. In FIG. 4A, the color of the turn-off state is indicated as the colorless eco-lamp 5. Also, when the providing information level is specified as "level 2", the instruction information generating section 204 generates instruction information to display the second display state (i.e. the second display state with the eco-lamp 5 in blue color by supplying power to and turning on the blue LED elements constituting the eco-lamp 5). In this case, the eco-lamp 5 is in the second display state as shown in FIG. 4B. In FIG. 4B, the blue color is indicated as a dotted eco-lamp 5. Furthermore, when the providing information level is specified as "level 3", the instruction information generating section 204 generates instruction information to display the third display state (i.e. the third display state with the eco-lamp 5 in green color by supplying power to and turning on the green LED elements constituting the eco-lamp 5). In this case, the eco-lamp 5 is in the third display state as shown in FIG. 4C. In FIG. 4C, the green color is indicated as a further densely dotted eco-lamp 5 compared to the eco-lamp 5 in FIG. 4B. FIGS. 4A to 4C are shown as an embodiment, thus, any other display state may be adopted.

The instruction information output section 205 receives the instruction information (instruction information respectively to the instrument panel 4 and the eco-lamp 5) generated by the instruction information generating section 204, and outputs instruction signals as the instruction information to the instrument panel 4 and the eco-lamp 5, respectively. In this way, the instrument panel 4 and the eco-lamp 5 respectively realize the providing states of the vehicle information according to the instruction information as described above.

Procedure of Vehicle Information Providing Processing

Figure 8:
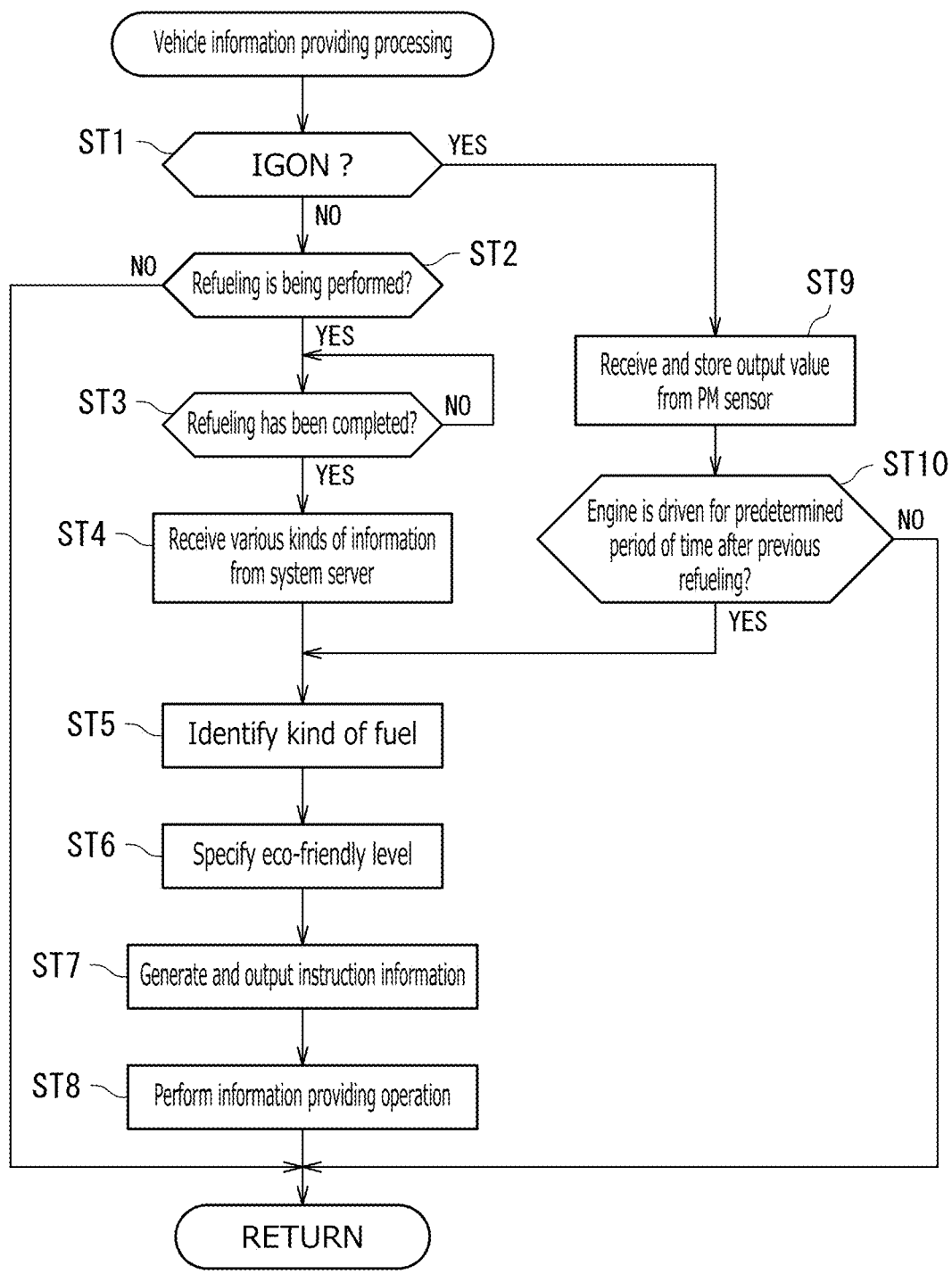
FIG. 8 is a flowchart indicating a procedure of vehicle information providing processing.

Here, a description is given on the procedure of the vehicle information providing processing in the vehicle information providing system 1 configured as described above. The description below is regarding the vehicle V having a diesel engine. FIG. 8 is a flowchart indicating the procedure of the vehicle information providing processing. This flowchart is repeatedly performed by the vehicle display control device 200 at a predetermined time interval.

In step ST1, it is determined whether a start switch (IG switch) of the vehicle V is currently ON or not.

When the start switch (IG switch) is not ON and thus it is determined to be "NO" in step ST1, the procedure advances to step ST2 where it is determined whether the refueling is currently being performed or not. This determination is performed, for example, based on detection signals from a sensor or a switch that detects the opened/closed state of a lid of the gas port of the vehicle V.

When the refueling is being performed and thus it is determined to be "YES" in step ST2, the procedure advances to step ST3 where it is determined whether the refueling has been completed or not. For example, it is determined that the refueling has been completed when the sensor detects that the lid of the gas port has been closed.

When the refueling has been completed and thus it is determined to be "YES" in step ST3, the procedure advances to step ST4 to receive various kinds of information from the system server 100. Specifically, the driving energy source information receiving section 201 of the vehicle display control device 200 receives: image information from the image information transmitter-receiver 101 (image information on the operation state of the operation panel 21 of the fueling machine 2 and on which fuel filling nozzle is used); payment information from the payment information transmitter-receiver 102 (information on making a payment by the driver (i.e. information on the supplied amount and on the payment amount)); and information from the driving energy source generation information transmitter-receiver 103 (the unit price and the fuel generation information). Among the above kinds of information, the image information from the image information transmitter-receiver 101 and the information from the driving energy source generation information transmitter-receiver 103 may be received during the refueling (i.e. within the period of time from the determination "YES" in step ST2 to the determination "YES" in step ST3).

In step ST5, the kind of the fuel is identified based on the information received by the driving energy source information receiving section 201 (i.e. operation for identifying the kind of the fuel by the driving energy source information identifying section 202). Here, it is identified whether the fuel used for refueling the diesel engine is a diesel fuel or an e-diesel (in the case where the fuel is determined to be the e-diesel, the procedure further includes the identification of whether the energy for generating the electric power used for producing $H_2$ is renewable energy or not).

After that, the procedure advances to step ST6 to specify the eco-friendly level of the fuel identified in step ST5. Specifically, when the fuel identified in step ST5 is the diesel fuel, the level is specified as "level 1". When the fuel identified in step ST5 is the e-diesel, and furthermore when the fuel generation information on the e-diesel includes the information that the electric power used for producing $H_2$ by electrolyzing water is generated by the energy other than the renewable energy, the level is specified as "level 2". On the other hand, when the fuel generation information on the e-diesel includes the information that the above electric power is generated by the renewable energy, the level is specified as "level 3".

After specifying the eco-friendly level of the fuel as described above, the procedure advances to step ST7 to generate the instruction information to instruct the providing state of the information according to the specified eco-friendly level (this instruction information is generated by the instruction information generating section 204) and to output the instruction signals according to the instruction information to the instrument panel 4 and the eco-lamp 5 (this instruction signals are output by the instruction information output section 205).

In this way, in step ST8, information providing operations are respectively performed in the instrument panel 4 and the eco-lamp 5. Specifically, when the providing information level is specified as "level 1" because the diesel fuel is used for refueling, the instrument panel 4 is in the first display state with the background in black color (color of the turn-off state) by not supplying power to the LED elements of the background area 46 (in the state as shown in FIG. 3A), while the eco-lamp 5 is also in the first display state in black or white color (color of the turn-off state) by not supplying power to the LED elements (in the state as shown in FIG. 4B).

Also, when the providing information level is specified as "level 2" because the e-diesel is used for refueling and furthermore the information that the electric power used for producing $H_2$ by electrolyzing water is generated by the energy other than the renewable energy is included, the instrument panel 4 is in the second display state with the background (the background area 46) in blue color by supplying power to and turning on the blue LED elements constituting the background area 46 (in the state as shown in FIG. 3B), while the eco-lamp 5 is also in the second display state in blue color by supplying power to and turning on the blue LED elements (in the state as shown in FIG. 4B).

Also, when the providing information level is specified as "level 3" because the e-diesel is used for refueling and furthermore the information that the electric power used for producing $H_2$ by electrolyzing water is generated by the renewable energy is included, the instrument panel 4 is in the third display state with the background (the background area 46) in green color by supplying power to and turning on the green LED elements constituting the background area 46 (in the state as shown in FIG. 3C), while the eco-lamp 5 is also in the third display state in green color by supplying power to and turning on the green LED elements (in the state as shown in FIG. 4C).

On the other hand, when the start switch (IG switch) is ON and thus it is determined to be "YES" in step ST1, the procedure advances to step ST9 to receive the sensor output (output value) from the PM sensor 7 and store the information thereon.

Also, when it is determined to be "NO" in step ST2 (i.e. not during the refueling), the procedure returns because the vehicle V is supposed to be stopped, for example, so as to wait for the traffic light to change.

In step ST10, it is determined whether or not the engine is driven for a predetermined period of time after the previous refueling. This operation is performed by a timer provided so as to be reset at the timing when it is determined to be "YES" in step ST2. This timer measures the integrated time when the engine is driven (including traveling by engine torque, and idling). The predetermined period of time defined here is a time when the gradient of change in the sensor output of the PM sensor 7 appears as a gradient of change from which the kind of fuel can be determined. The predetermined period of time is set by experiments and/or simulations.

Thus, when the engine driving time from the previous refueling is less than the predetermined period of time, it is determined to be "NO" because the sensor output from the PM sensor 7 corresponding to the kind of fuel is not yet obtained (the sufficient gradient of change in the sensor output is not yet obtained to determine the kind of the fuel). Thus, the procedure returns.

On the other hand, when the engine is driven for the predetermined period of time from the previous refueling and thus it is determined to be "YES" in step ST10, the procedure goes to the step ST5 to identify the kind of the fuel based on the gradient of change in the sensor output from the PM sensor 7 (i.e. the operation for identifying the kind of the fuel by the driving energy source information identifying section 202). After that, the operations in steps ST6 to ST8 are performed as described above. Thus, the information providing operation according to the providing information level is performed in the instrument panel 4 and the eco-lamp 5. The identification of the kind of the fuel based on the gradient of change in the sensor output from the PM sensor 7 and the information providing operation according to the providing information level are cancelled when the fuel tank is refueled (at the time of when it is determined to be "YES" in step ST2) so that the procedure is switched to the information providing operation in steps ST4 and after.

The above operations are repeatedly performed.

Effects of Embodiment

In this embodiment as described above, the kind of the fuel stored in the fuel tank is identified, and the instruction information according to the identified kind of the fuel is generated. Thus, the providing state of the vehicle information in the instrument panel 4 and the eco-lamp 5 is changed according to the instruction information. Therefore, it is possible to obtain the providing state of the vehicle information according to the kind of the fuel, which results in providing appropriate vehicle information (information on whether the vehicle is an eco-friendly type or not) in consideration of the fact that even when the vehicle model is the same, the environmental impact (environmental burden) may differ depending on the kind of the used fuel.

Also in this embodiment, the display color of the instrument panel 4 is changed as the providing state of the vehicle information. Thus, it is possible to provide the driver with appropriate vehicle information (information on whether the vehicle V is an eco-friendly type or not) on the condition that the driver of the vehicle V recognizes, in advance, the relationship between the display color of the instrument panel 4 and the magnitude of the environmental burden derived from the kind of the fuel. Furthermore, it is possible for the driver to be conscious of driving for decreasing the environmental burden (i.e. driving without sudden start and sudden acceleration), or to be conscious of his/her high social status.

Also in this embodiment, the turn-on state of the eco-lamp 5 is changed as the providing state of the vehicle information. Thus, it is possible to give appropriate vehicle information (information on whether the vehicle V is an eco-friendly type or not) to the outside of the vehicle V (for example, to passerby) on the condition that the relationship between the turn-on state of the eco-lamp 5 and the magnitude of the environmental burden derived from the kind of the fuel is commonly known. Furthermore, it is possible to demonstrate, to the outside, eco-friendliness and high quality of the vehicle V.

Also in this embodiment, the kind of the fuel is identified during the refueling of the vehicle V or when the refueling is completed in the service station SS so as to provide the corresponding vehicle information. Thus, it is possible to early realize an appropriate providing state of the vehicle information, which also can prevent continuous indication of the providing state of the vehicle information (inappropriate vehicle information) that is derived from the information on the fuel previously supplied to the fuel tank (i.e. the fuel already consumed to a certain extent).

Also in this embodiment, it is possible to provide the vehicle information reflecting the fuel generation information. Even when the fuels have the same name, the LCA differs from each other between the fuel generated in the condition in which the environmental burden is large and the fuel generated in the condition in which the environmental burden is small. In this embodiment, it is possible to provide the vehicle information reflecting the above conditions, which leads to further detailed vehicle information.

Also in this embodiment, the fuel is identified using the gradient of change in the sensor output of the PM sensor 7 after elapse of the predetermined period of time from the start of driving the diesel engine. Thus, it is possible to identify the information on the fuel not using the information from the outside, for example, the service station SS. In other words, it is possible to provide the vehicle information without communicating with the outside.

Variation 1

Now, variation 1 is described. In this variation, the providing state of the vehicle information differs from that in the above described embodiment. Thus, only the providing state of the vehicle information is described here.

The vehicle V according to this variation includes a public known vehicle body color changing section, which can change the color of the vehicle body. Thus, the vehicle body color is changed here as the providing state of the vehicle information, by the vehicle body color changing section.

Examples of the vehicle body color changing section that changes the color of the vehicle body include a configuration in which microcapsules containing negatively charged pigments of a specific color and positively charged pigments of another specific color are provided on the whole surface of a vehicle body panel so as to change the color of the vehicle body by changing the magnetic field of the vehicle body panel and thus collecting the pigments of either one color on the surface of the vehicle body panel. Also, the color of the vehicle body can be further changed to a color other than the colors realized by the pigments included in the microcapsules, by degaussing the vehicle body panel. Using the above technic, the color of the vehicle body is changed according to the providing information level.

Figure 9A:
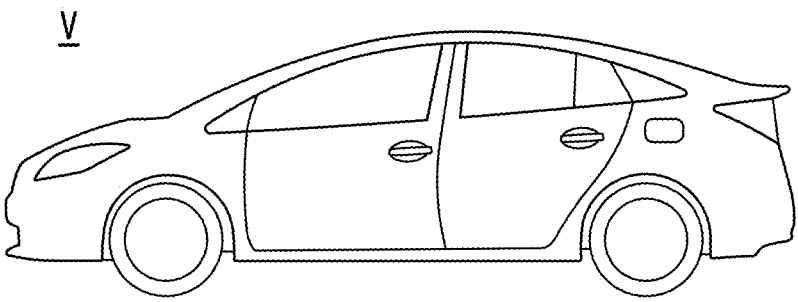
FIG. 9A is a diagram indicating a first display state of a side surface of a vehicle according to variation 1.
Figure 9B:
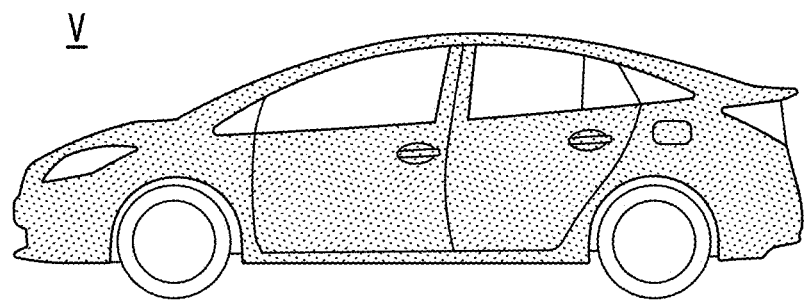
FIG. 9B is a diagram indicating a second display state of the side surface of the vehicle according to variation 1.
Figure 9C:
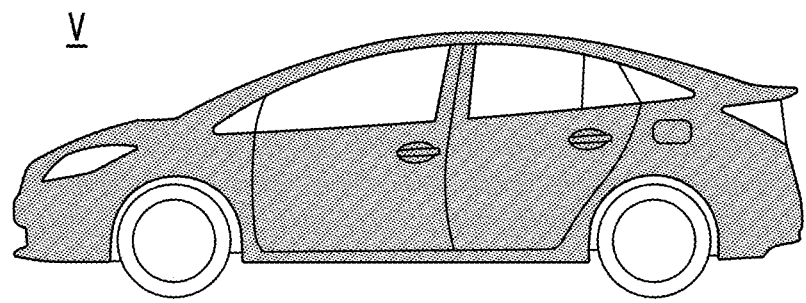
FIG. 9C is a diagram indicating a third display state of the side surface of the vehicle according to variation 1.

FIGS. 9A to 9C show the vehicle body colors changed according to the three kinds of providing information levels similarly to the case in the above-described embodiment. FIG. 9A shows a first display state (for example, the state in which the vehicle body color is white) when the providing information level is specified as "level 1" as described above. FIG. 9B shows a second display state (for example, the state in which the vehicle body color is blue) when the providing information level is specified as "level 2" as described above. FIG. 9C shows a third display state (for example, the state in which the vehicle body color is green) when the providing information level is specified as "level 3" as described above. The above colors in the respective display states are not limited thereto. They can be arbitrarily set.

In this variation, it is possible to give appropriate vehicle information to the outside of the vehicle (for example, to passerby) on the condition that the relationship between the vehicle body color and the magnitude of the environmental burden derived from the kind of the fuel is commonly known. Furthermore, it is possible to demonstrate, to the outside, eco-friendliness and high quality of the vehicle V.

Variation 2

Next, variation 2 is described. In this variation, the operation to identify the kind of the fuel based on changes in the sensor output of the PM sensor 7 differs from that in the above described embodiment. Thus, only the operation to identify the kind of the fuel based on changes in the sensor output of the PM sensor 7 is described here.

In this variation, it is assumed that both the diesel fuel and the e-diesel are stored in the fuel tank. As the fuels are consumed, the providing information level is changed. Thus, the providing state of the vehicle information is changed using at least one of the instrument panel 4, the eco-lamp 5, and the vehicle body color changing section.

Figure 10:
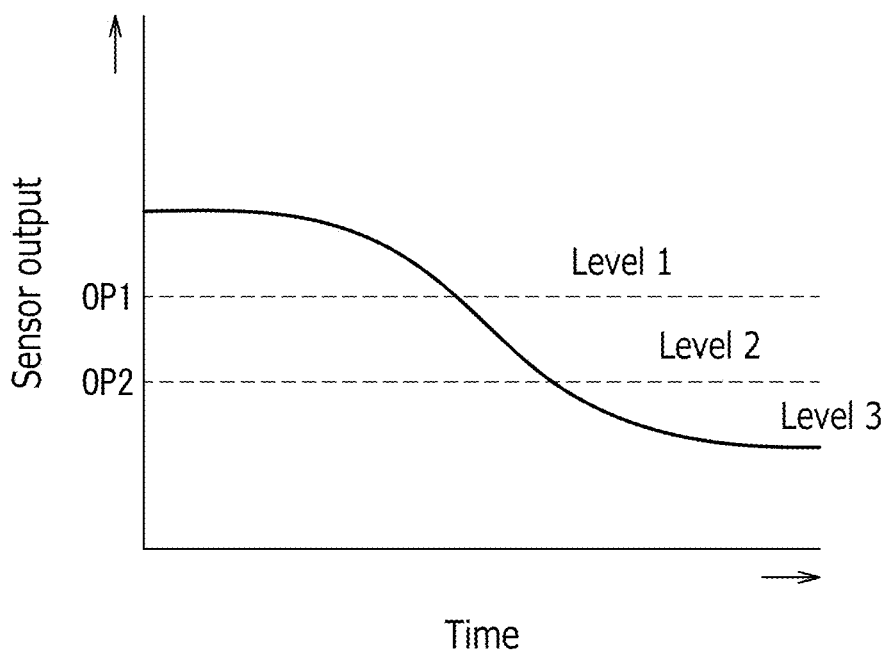
FIG. 10 is a graph indicating an example of a change in sensor output of the PM sensor according to variation 2.

FIG. 10 is a graph indicating an example of a change in the sensor output of the PM sensor 7 according to variation 2. The change in the sensor output in FIG. 10 indicates that: after the initial state in which the amount of the diesel fuel is larger than the amount of the e-diesel in the fuel tank, the sensor output gradually decreases as the rate of the e-diesel increases in association with the consumption of the fuel (especially as a result of preferential consumption of the diesel fuel).

In this variation, when the sensor output is not less than OP1 in the graph, the providing information level is specified as "level 1". When the sensor output is less than OP1 and not less than OP2 in the graph, the providing information level is specified as "level 2". When the sensor output is less than OP2 in the graph, the providing information level is specified as "level 3".

As can be seen from FIG. 10, as the rate of the e-diesel increases due to consumption of the fuel, the providing information level shifts in the following order: "level 1"→"level 2"→"level 3". According to this shift, the instrument panel 4, the eco-lamp 5 and the color of the vehicle body realized by the vehicle body color changing section (which are exemplarily listed here) also shift in the following order: "first display state"→"second display state"→"third display state".

In this variation as described above, when the fuel tank is not refueled, the providing state of the vehicle information is changed in association with the consumption of the fuel. Thus, the impact to the environment (environmental burden) can be appropriately provided in real time.

Other Embodiments

The present invention is not limited to the above-described embodiment and the variations. All modifications and changes that come within the meaning and range of equivalency of the claims are intended to be embraced therein.

For example, in the embodiment and the variations as described above, the vehicle V constructing the vehicle information providing system 1 is a so-called conventional vehicle that has only an internal combustion engine as the driving force source. However, the present invention is not limited thereto. The vehicle V may be an electric vehicle. In this case, the driving energy source is electric power, and the driving force source is an electric motor. Thus, according to information on the magnitude of the environmental burden when generating the electric power as the driving energy source, the providing state of the vehicle information is changed using the instrument panel 4, the eco-lamp 5 and the vehicle body color changing section. Also, when a plug-in hybrid vehicle is used as a vehicle V, the driving energy source is a fuel and electric power, and the driving force source is an internal combustion engine and an electric motor. Thus, according to the kind of the fuel, information on the magnitude of the environmental burden when generating this fuel, and information on the magnitude of the environmental burden when generating the electric power, the providing state of the vehicle information is changed using the instrument panel 4, the eco-lamp 5 and the vehicle body color changing section. Furthermore, when a vehicle using hydrogen as the energy source (i.e. a vehicle on which a fuel cell or a hydrogen engine is mounted) is used as the vehicle V, the driving energy source is hydrogen, and the driving force source is a fuel cell stack and an electric motor. Thus, according to information on the magnitude of the environmental burden when generating hydrogen, the providing state of the vehicle information is changed using the instrument panel 4, the eco-lamp 5 and the vehicle body color changing section. In addition, when a hybrid vehicle is used as the vehicle V, the driving energy source is a fuel, and the driving force source is an internal combustion engine and an electric motor. In this case, according to the kind of the fuel and information on the magnitude of the environmental burden when generating this fuel, the providing state of the vehicle information is changed, similarly to the above-described embodiment, using the instrument panel 4, the eco-lamp 5 and the vehicle body color changing section.

Also, in the embodiment and the variations as described above, the three levels are set as the providing information levels that are changeable. However, the present invention is not limited thereto. Two levels, or four or more levels may also be set. That is, the background color of the instrument panel 4 may be switched between the display states in two patterns, or in four patterns or more. The color of the eco-lamp 5 may be switched between the display states in two patterns, or in four patterns or more. Also, the vehicle body color may be switched between the display states in two patterns, or in four patterns or more.

Also, in the embodiment and the variations as described above, the providing information level is according to the magnitude of the environmental burden. However, the present invention is not limited thereto. The providing information level may be according to changes in the various conditions due to difference in the used driving energy source (the fuel and the like). For example, when the combustion characteristics (which affect the traveling performance) of the vehicle is changed depending on the kind of the fuel, the providing state of the vehicle information may be changed by setting the traveling performance as the vehicle information. In this case, the determination may be performed based on changes in the combustion characteristics, and thus the color of the instrument panel 4, the color of the eco-lamp 5 and the vehicle body color may be changed. More specifically, the green color may be set as a color when the traveling performance is low while the red color may be set as a color when the traveling performance is high. Also, when the fuel consumption rate is changed depending on the kind of the fuel, the providing state of the vehicle information may be changed by setting the fuel consumption rate as the vehicle information. In this case, as the color of the instrument panel 4, the color of the eco-lamp 5 and the vehicle body color, the red color may be set as a color when the fuel consumption rate is high while the green color may be set as a color when fuel consumption rate is low. These colors may be arbitrarily set.

Also, in the embodiment and the variations as described above, the system server 100 is provided in the service station SS. However, the present invention is not limited thereto. The function of the system server 100 may be added to the cloud server that totally manages the pieces of information of the plurality of service stations SS. Also, the vehicle V is not necessarily required to include the driving energy source information receiving section 201, the driving energy source information identifying section 202, the providing information level specifying section 203, the instruction information generating section 204, and the instruction information output section 205 (i.e. the above sections are not needed to be function sections of the vehicle display control device 200 mounted on the vehicle V). These sections may be included in the system server 100.

Also, in the embodiment and the variations as described above, the fuels to be selected are the diesel fuel and the e-diesel. However, the present invention is not limited thereto. The present invention can also be applied to the case in which the gasoline and the e-gasoline are selected for refueling, or to the case in which the publicly known GTL (Gas to Liquids) and another fuel are selected for refueling. The GTL is a publicly known liquid fuel made by dissolving natural gas into CO and $H_2$ to rearrange the molecular structure.

Also, in the embodiment as described above, the vehicle information is provided by both the instrument panel 4 and the eco-lamp 5. That is, the vehicle information is given to both the inside and the outside of the vehicle. However, the present invention is not limited thereto. The vehicle information may be provided to either one of the inside and outside of the vehicle. Also, in the embodiment and the variations as described above, the sensor output from the PM sensor 7 is used when the fuel is identified based on the inside information of the vehicle V. However, the present invention is not limited thereto. The fuel may be identified by other means. For example, when the engine torque with respect to the fuel injection amount into the cylinder of the engine changes depending on the kind of the fuel, the fuel may be identified based on the relationship between the fuel injection amount and the engine torque. Also, when the fuel consumption rate changes depending on the kind of the fuel, the fuel may be identified based on the fuel consumption rate. Also, in the embodiment and the variations as described above, even when the driving energy sources have the same name (such as the e-diesel), if their generation processes differ from each other, they are treated as the different kinds of driving energy sources (specifically, the driving energy sources in the different providing information levels). However, the present invention is not limited thereto. The driving energy sources may be treated as different kinds only when they have different names.

The concept of the term "vehicle" in the present invention includes mobility vehicles other than the automobiles. For example, the term "vehicle" includes various kinds of moving bodies such as an electric bicycle and an electric kick scooter.

INDUSTRIAL APPLICABILITY

The present invention is suitably applied to a system for providing information on a vehicle having a driving force source that can select and use a plurality of kinds of driving energy sources.

REFERENCE SIGNS LIST

1 Vehicle information providing system
3 Camera
4 Instrument panel (information providing section)
46 Background area
5 Eco-lamp (information providing section)
100 System server
101 Image information transmitter-receiver
102 Payment information transmitter-receiver
103 Driving energy source generation information transmitter-receiver
200 Vehicle display control device
202 Driving energy source information identifying section
204 Instruction information generating section
SS Service station
V Vehicle

What is claimed is:
1. A vehicle information providing system for providing information on a vehicle having a driving force source capable of selecting and using a plurality of kinds of driving energy sources, the vehicle information providing system comprising:
a driving energy source information identifying section that identifies information on a driving energy source stored in a driving energy source storage part;
an instruction information generating section that generates instruction information to instruct a providing state of vehicle information according to the information on the driving energy source identified by the driving energy source information identifying section; and
an information providing section that changes the providing state of the vehicle information according to the instruction information generated by the instruction information generating section, wherein the information providing section is a vehicle body color changing section capable of changing a color of a body of the vehicle, and the change in the providing state of the vehicle information is a change in the color of the body of the vehicle by the vehicle body color changing section.

2. The vehicle information providing system according to claim 1, wherein the driving force source is an internal combustion engine, and the driving energy source is a fuel used for driving the internal combustion engine.

3. The vehicle information providing system according to claim 1, wherein the driving force source is an electric motor, and the driving energy source is electric power used for driving the electric motor.

4. The vehicle information providing system according to claim 1, wherein the information on the driving energy source is any one of: information on magnitude of an environmental burden when the driving energy source is used; information correlated with the magnitude of the environmental burden when the driving energy source is used; information on the magnitude of the environmental burden when the driving energy source is generated; and information correlated with the magnitude of the environmental burden when the driving energy source is generated.

5. A vehicle information providing system for providing information on a vehicle having a driving force source capable of selecting and using a plurality of kinds of driving energy sources, the vehicle information providing system comprising:

a driving energy source information identifying section that identifies information on a driving energy source stored in a driving energy source storage part;

an instruction information generating section that generates instruction information to instruct a providing state of vehicle information according to the information on the driving energy source identified by the driving energy source information identifying section; and an information providing section that changes the providing state of the vehicle information according to the instruction information generated by the instruction information generating section, wherein the driving energy source information identifying section identifies the information on the driving energy source when the driving energy source storage part of the vehicle is refueled with the driving energy source in a service station, the service station is provided with a camera that takes images of a refueling operation to refuel the driving energy source storage part of the vehicle with the driving energy source, and the driving energy source information identifying section receives information on the images of the refueling operation taken by the camera, and identifies the information on the driving energy source stored in the driving energy source storage part based on the received information on the taken images.

6. The vehicle information providing system according to claim 5, wherein the driving force source is an internal combustion engine, and the driving energy source is a fuel used for driving the internal combustion engine.

7. The vehicle information providing system according to claim 5, wherein the driving force source is an electric motor, and the driving energy source is electric power used for driving the electric motor.

8. The vehicle information providing system according to claim 5, wherein the information on the driving energy source is any one of: information on magnitude of an environmental burden when the driving energy source is used; information correlated with the magnitude of the environmental burden when the driving energy source is used; information on the magnitude of the environmental burden when the driving energy source is generated; and information correlated with the magnitude of the environmental burden when the driving energy source is generated.

9. A vehicle information providing system for providing information on a vehicle having a driving force source capable of selecting and using a plurality of kinds of driving energy sources, the vehicle information providing system comprising:

a driving energy source information identifying section that identifies information on a driving energy source stored in a driving energy source storage part;

an instruction information generating section that generates instruction information to instruct a providing state of vehicle information according to the information on the driving energy source identified by the driving energy source information identifying section; and an information providing section that changes the providing state of the vehicle information according to the instruction information generated by the instruction information generating section, wherein the driving energy source information identifying section identifies the information on the driving energy source when the driving energy source storage part of the vehicle is refueled with the driving energy source in a service station, and the driving energy source information identifying section receives payment information after completion of refueling of the driving energy source storage part of the vehicle with the driving energy source so as to calculate a unit price of the driving energy source by the payment information, and identifies the information on the driving energy source stored in the driving energy source storage part based on the unit price.

10. The vehicle information providing system according to claim 9, wherein the driving force source is an internal combustion engine, and the driving energy source is a fuel used for driving the internal combustion engine.

11. The vehicle information providing system according to claim 9, wherein the driving force source is an electric motor, and the driving energy source is electric power used for driving the electric motor.

12. The vehicle information providing system according to claim 9, wherein the information on the driving energy source is any one of: information on magnitude of an environmental burden when the driving energy source is used; information correlated with the magnitude of the environmental burden when the driving energy source is used; information on the magnitude of the environmental burden when the driving energy source is generated;

and information correlated with the magnitude of the environmental burden when the driving energy source is generated.

\* \* \* \* \*